May 30, 1939. S. HILDER 2,160,361
CALCULATING MACHINE
Filed March 11, 1931 9 Sheets-Sheet 8
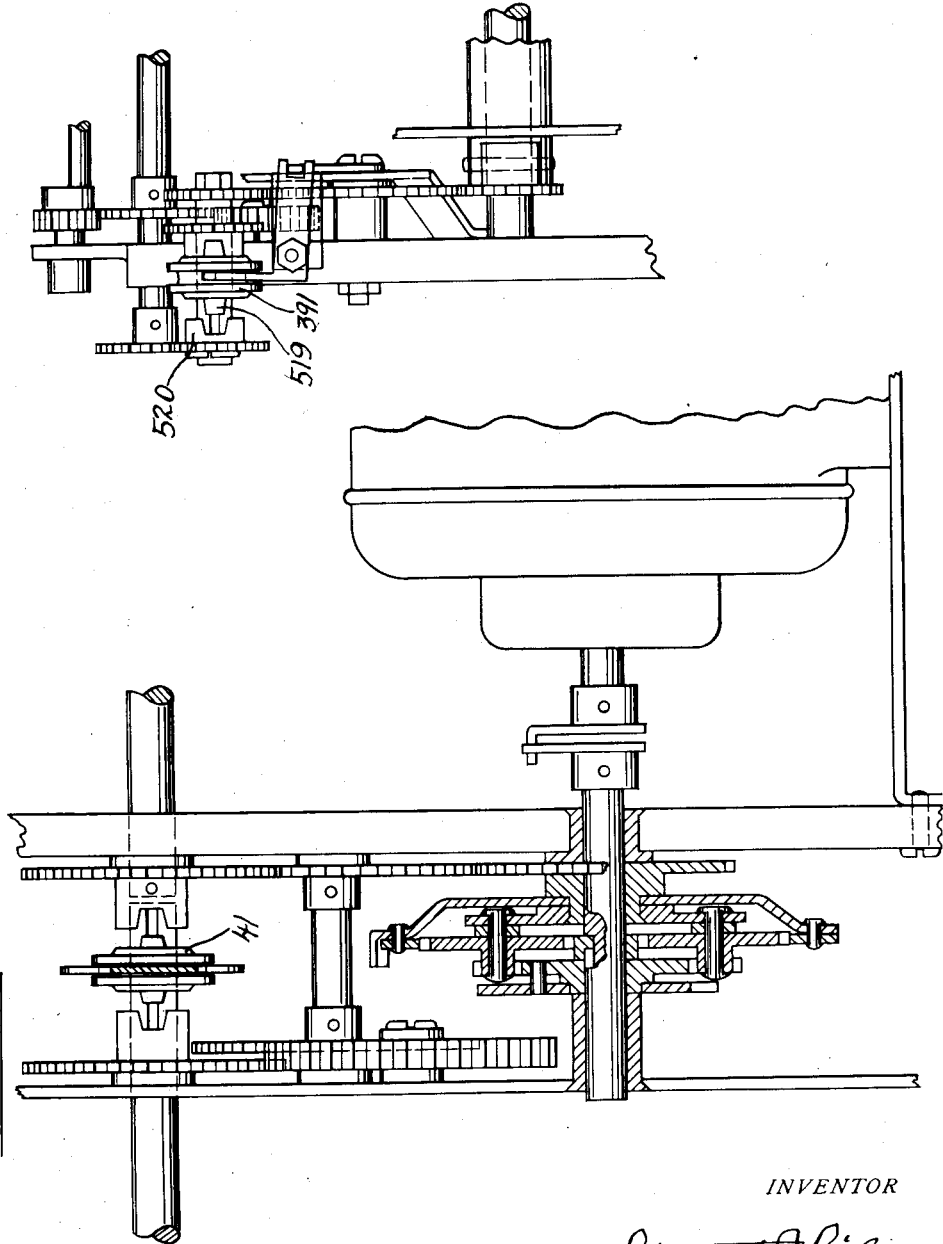
INVENTOR
Stuart Hilder

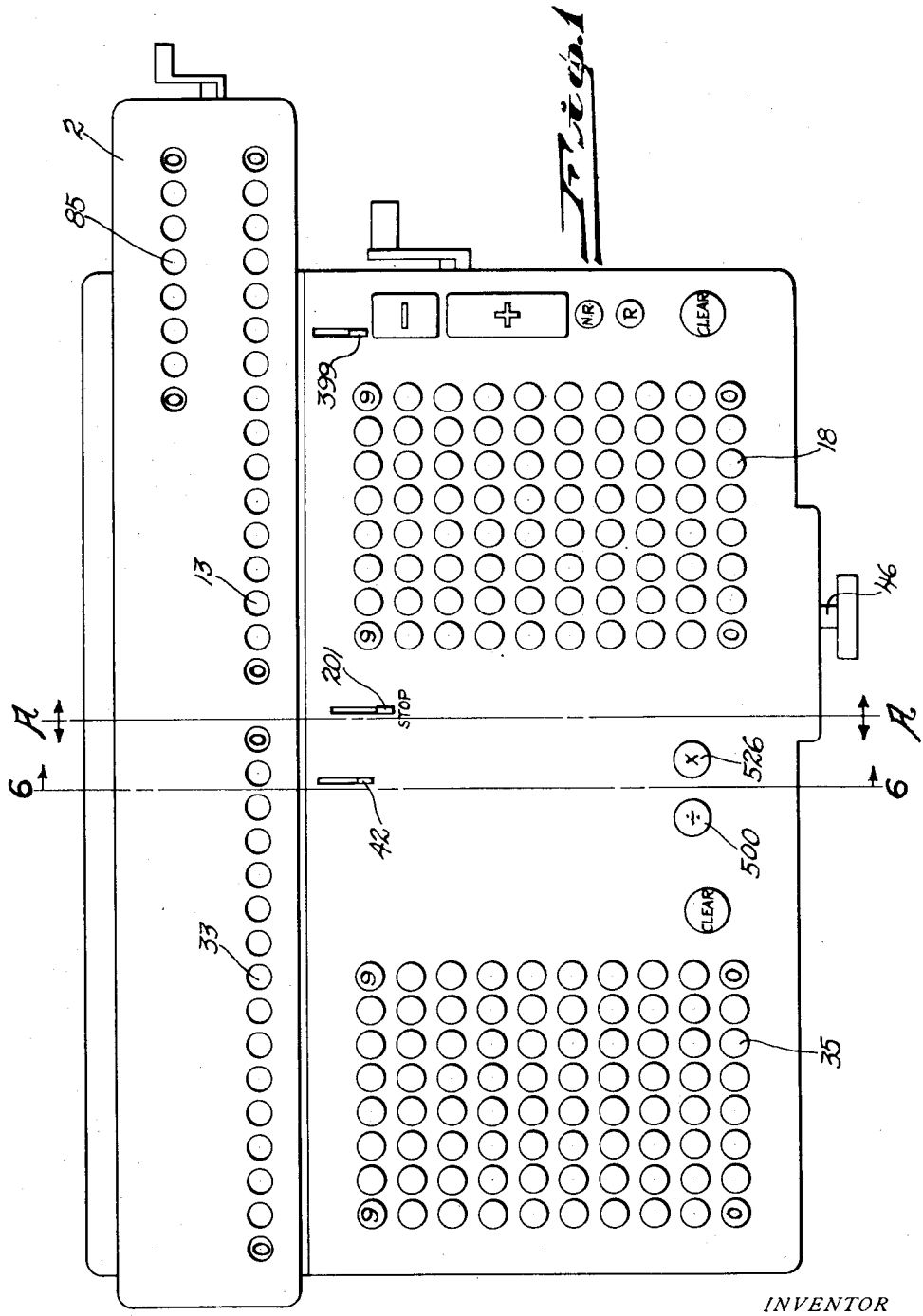

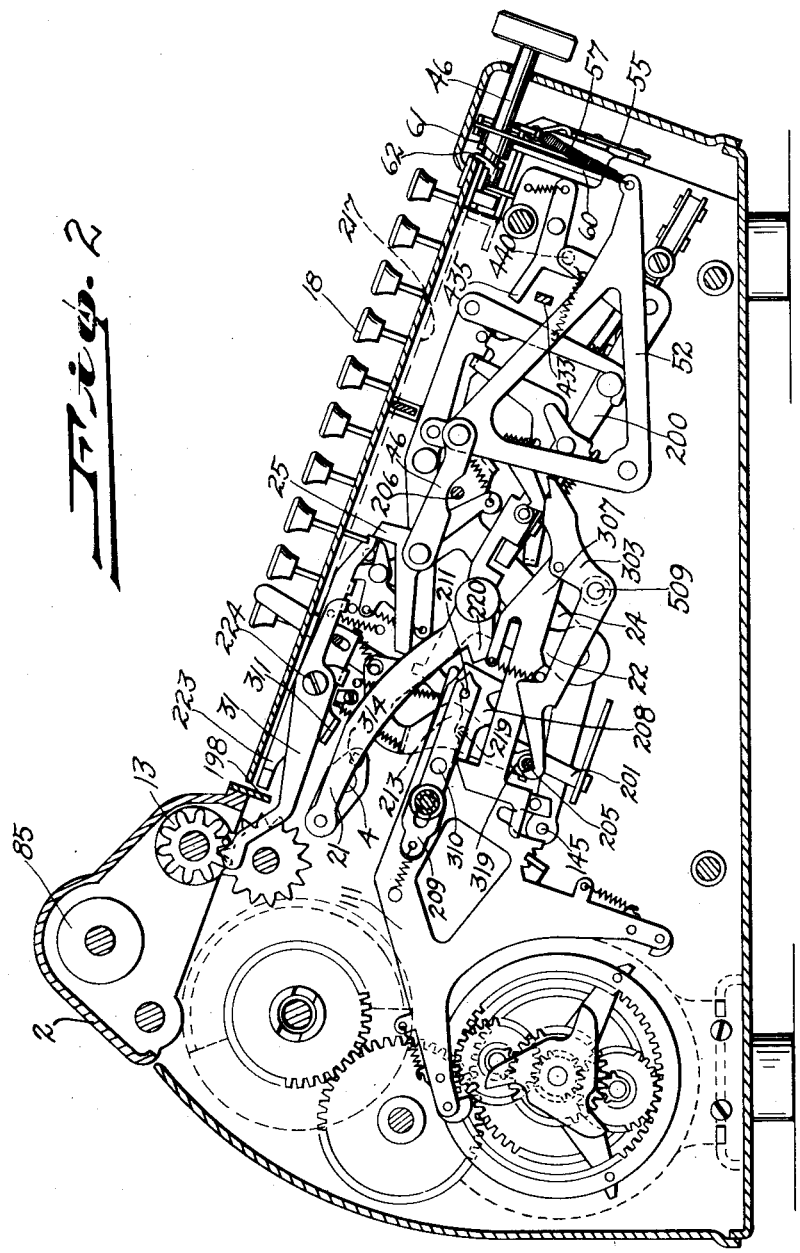

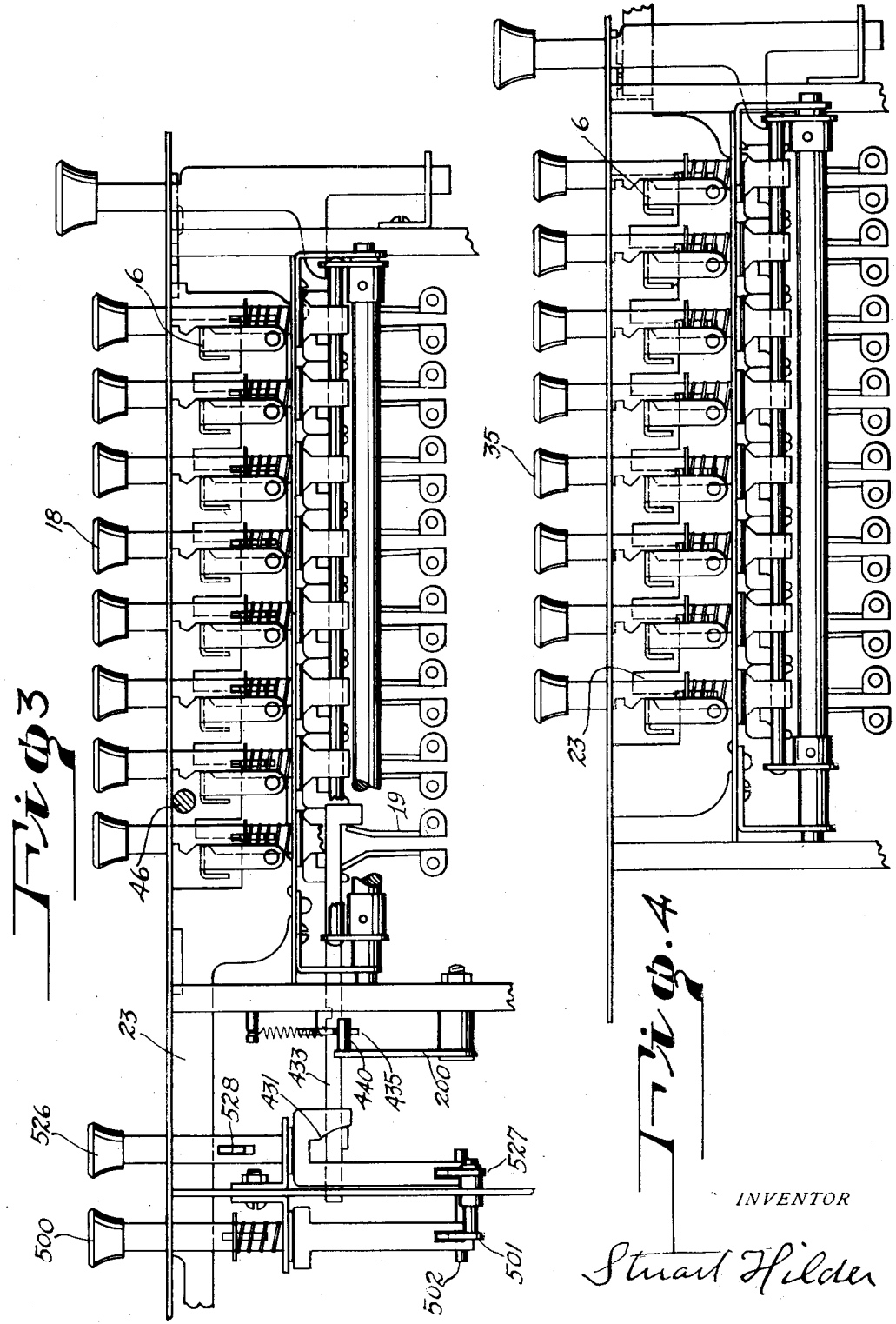

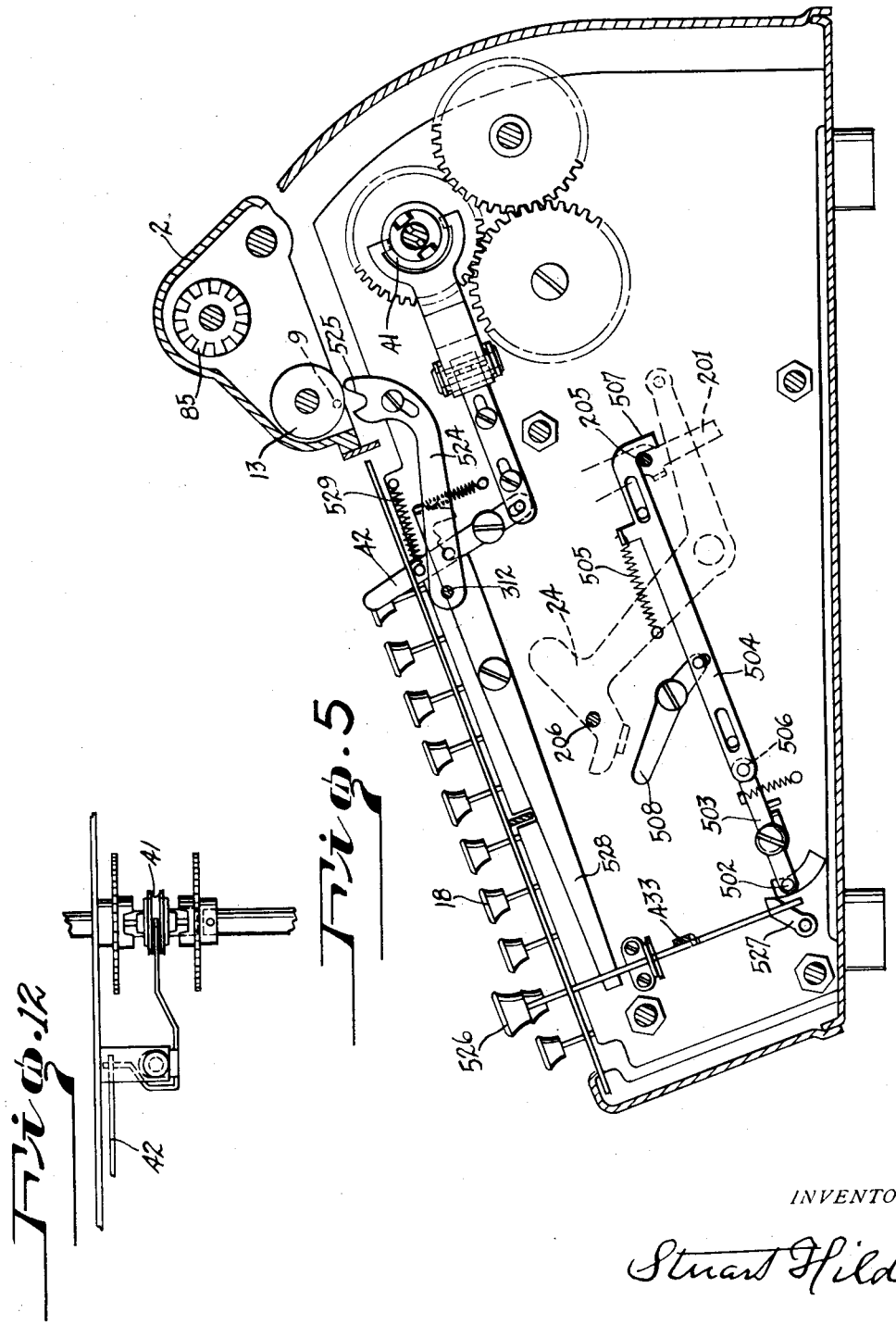

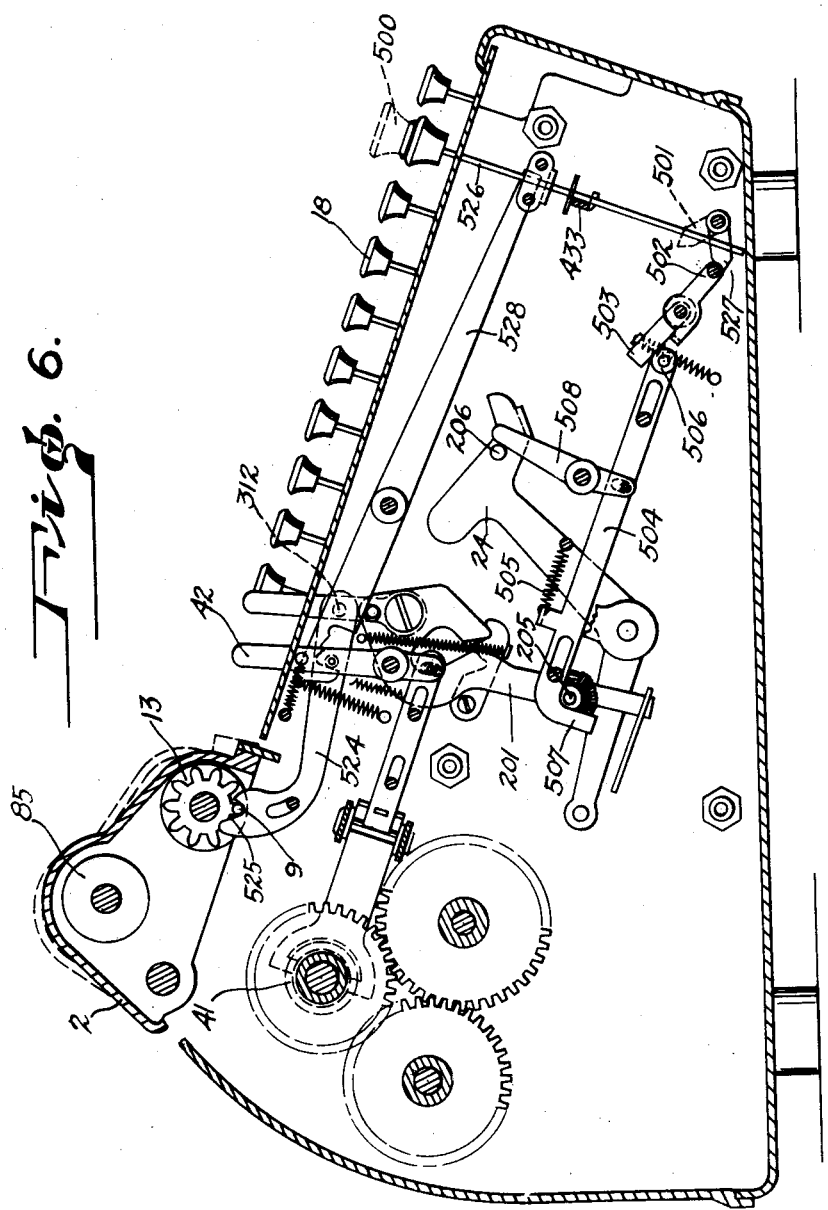

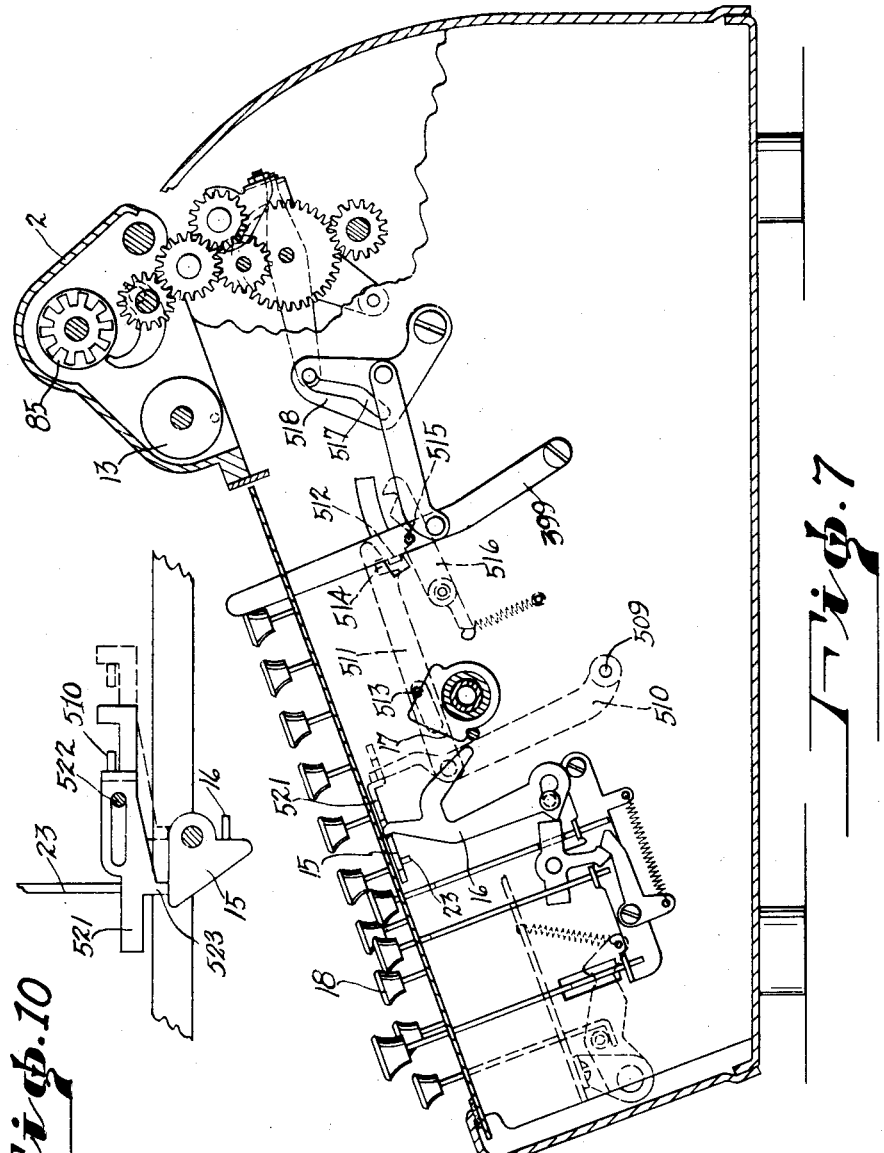

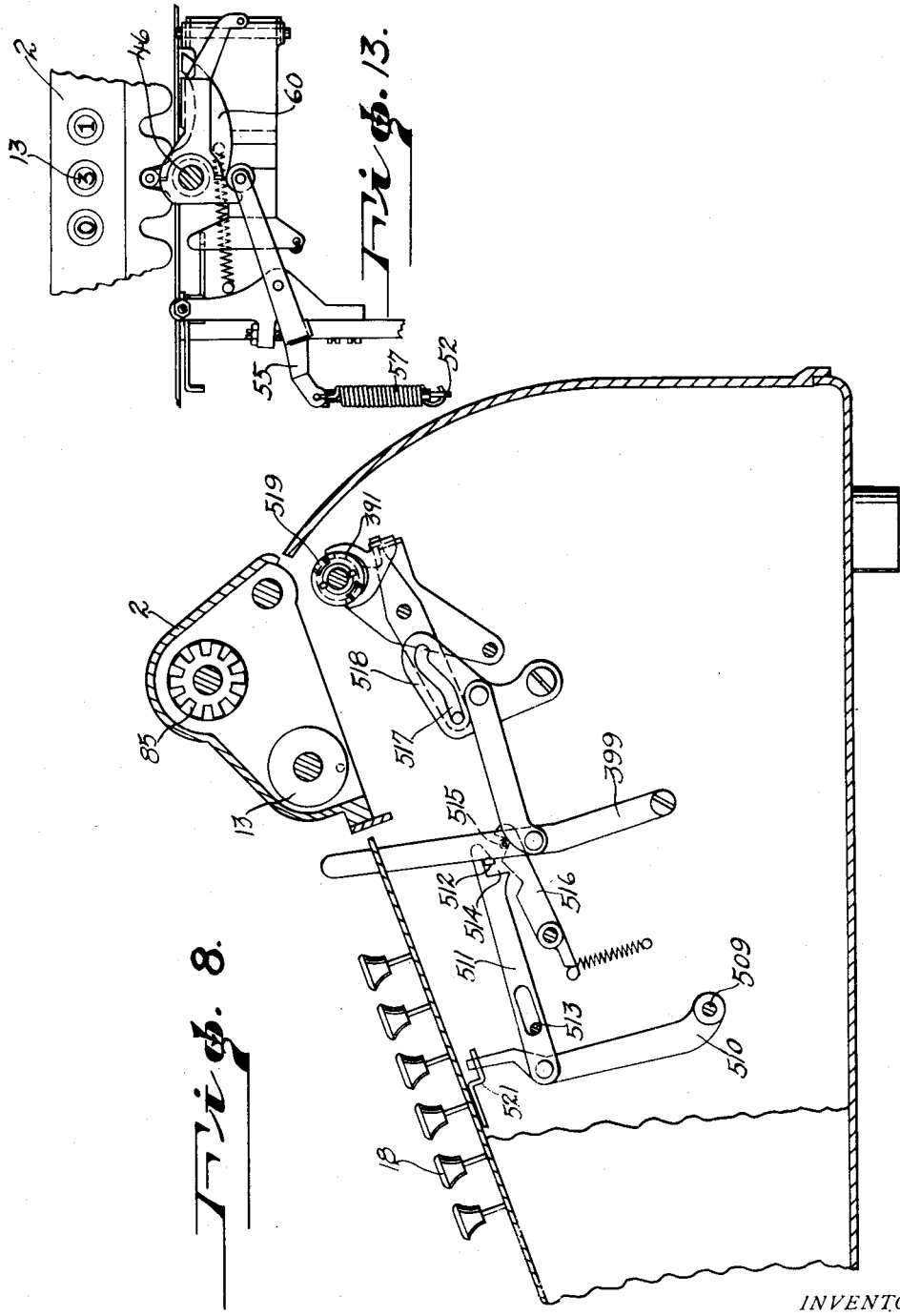

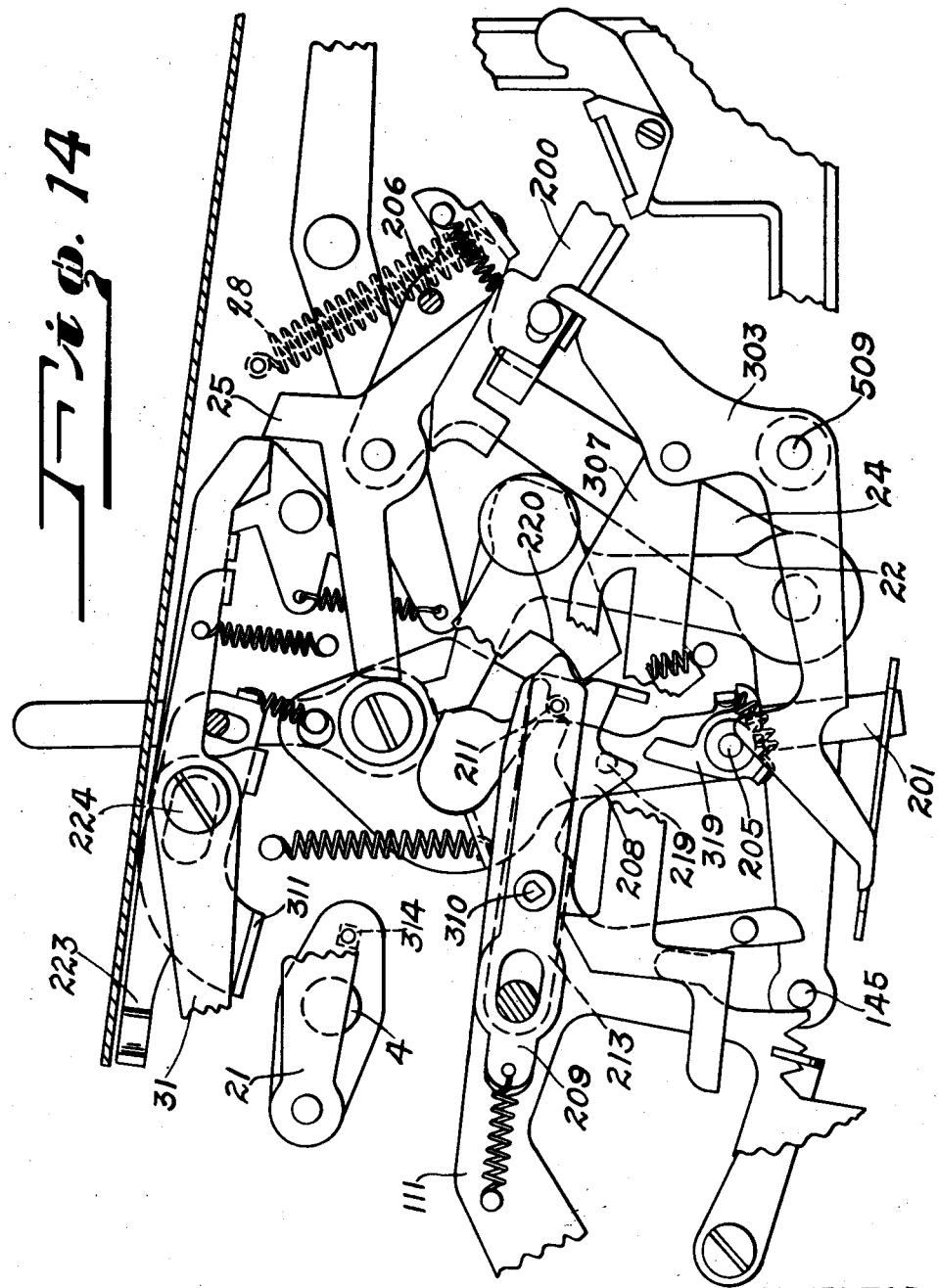

Patented May 30, 1939

2,160,361

UNITED STATES PATENT OFFICE 2,160,361

CALCULATING MACHINE

Stuart Hilder, Glencarlyn, Va., assignor to Monroe Calculating Machine Company, Orange, N. J., a corporation of Delaware Application March 11, 1931, Serial No. 521,624

8 Claims. (Cl. 235—82)

The invention relates to means for automatically controlling the registration devices of a calculating machine in the performance of different operations, more particularly where such operations include division of an amount registered in the numeral wheels of the machine by an amount set up in the keyboard.

Primarily, the invention contemplates the performance of division operations by subtracting a divisor from and by adding the same to a dividend registration in alternate ordinal places, as set forth in U. S. Patent No. 1,773,027, issued to George C. Chase on August 12, 1930. It is also useful in applying the same principle of operation to the means for performing multiplication set forth in application Serial No. 382,792, filed on August 1, 1929, by Lee R. Brown, which means, in the present disclosure is illustrated in the simplified form in which it might be applied to a dual machine of the type disclosed in U. S. Patent No. 1,793,155, issued to Edwin F. Britten, Jr., on February 17, 1931.

These patents and application disclose machines of the well-known Monroe type, illustrated in its essential features in U. S. Patents No. 1,566,650 and No. 1,664,661, issued respectively on December 22, 1925, and on April 3, 1928, to George C. Chase, to which reference is made for details of construction of the machine to which the present invention is shown as applied.

The invention consists in the novel construction and combination of parts, as set forth in the appended claims.

In the accompanying drawings, illustrating the invention:

Fig. 1 is a plan view of a calculating machine embodying the invention.

Fig. 2 is a section, taken on line A—A of Fig. 1, looking to the right.

Fig. 3 is a front elevation of the right-hand keyboard mechanism.

Fig. 4 is a similar view of the left-hand keyboard mechanism.

Fig. 5 is a section, taken on line A—A of Fig. 1, looking to the left.

Fig. 6 is a section, taken on line 6—6 of Fig. 1, with parts removed.

Fig. 7 is a right-hand elevation of the machine, with casing broken away.

Fig. 8 is a side elevation of certain parts shown in Fig. 7, in position taken during an operation.

Fig. 9 is a detail plan view of parts of the non-repeat mechanism.

Fig. 10 is a detail rear elevation of the counting wheel shift gearing.

Fig. 11 is a front elevation of the drive connections between the two halves of the machine.

Fig. 12 is a detail plan view of parts shown in Fig. 11.

Fig. 13 is a front elevation of the carriage shifting devices.

Fig. 14 is an enlarged side elevation of parts shown in Fig. 2, shown in position taken upon operation of the control lever.

In accordance with the prior art disclosures above noted, amounts set up on the keyboards 18 and 35 are registered either once or repeatedly upon numeral wheels 13 and 33, mounted in carriage 2, upon operation of the machine through one or more cycles, and the number of cycles of operation performed is registered upon counting wheels 85, also mounted in said carriage. These operations are performed by means of an electrically-operated drive mechanism, fully disclosed in the above-noted Patent No. 1,566,650.

Automatic division

The dividend having been registered in the numeral wheels 13 and the divisor set up on keyboard 18, the division operation will be performed upon movement of a control lever 201 to operative position, this lever acting to set automatic reversing and carriage shifting means and to engage the clutch in the operating train.

According to the invention, lever 201 is thrown into operative position by the utilization of stored energy, as follows:

A division key 500 (Figs. 1, 3, 6 and 14) is mounted near the front plate of the machine, between the keyboards 18 and 35, said key bearing against a pivoted tooth 501, normally overlying a pin 502 of tiltable latch 503. Latch 503 is designed to hold operating slide 504 against the tension of a spring 505, by engagement with antifriction roller 506 of said slide, and upon depression of key 500 and movement of tooth 501 will be tilted, to release the slide. At its rear end slide 504 has a projection 507 engaging pin 205 of control lever 201, so that upon release of the slide, spring 505 will act to throw said lever into operative position.

When key 500 is fully depressed, tooth 501 has been moved far enough to release pin 502, and latch 503 will fall upon roller 506, ready to relatch slide 504 as soon as the latter is retracted. This retraction will occur upon the first movement of stop arm 24 (hereinafter described), by means of a restoring lever 508, one arm of which engages slide 504, the other arm lying in the path of movement of a pin 206 of arm 24.

Tiltable latch 503 is made in two sections, extending oppositely from a common pivot stud, and so designed that the forward section, when depressed, will operate the rear section, but that, upon release of key 500, tooth 501, in rising, will displace the forward section and pass above pin 502, so that the parts may resume normal position.

In general, control lever 201 operates in accordance with the disclosure of Patent 1,773,027, as follows:

Control lever 201 (Fig. 2) has a pin 205 engaging a latch lever 303, designed to raise lock arm 200 and to latch it in raised position upon movement of the control lever to operative position. Lock arm 200 in rising frees the operating means of the machine by removing the stop from the path of movement of rock arm 22, connected by link 21 with the shaft 4 carrying the selector gears. Control lever 201 is also designed to throw clutch yoke 111 into subtractive position, this being accomplished by means of a pawl 319, operable upon a tooth 208 of clutch yoke 111. This will start the machine in operation in a subtractive direction.

Control lever 201 in moving to operative position will engage a pin 211 of sliding tooth 209 mounted on clutch yoke 111, carrying said tooth into forwardly projecting position, where it will be locked by means of a latch 213. This tooth governs the automatic reversal of the selecting gears and other operative elements of the machine in the following manner:

Numeral wheels 13 being rotated until a transitional carry occurs (Patent 1,566,650) trigger 31 will be tripped by a pin on the numeral wheel associated with the highest order carrying mechanism, releasing an element 25 mounted at the end of a stop arm 24, so that element 25 will fall into the path of movement of a lug upon rock arm 22. As the selecting gears pass through their full-cycle position, rock arm 22 will be swung forwardly, carrying therewith a stop arm 24, the latter arm being carried against a suitable fixed stop member, and further rotation of the selector gears in the original direction being thus arrested. As stop arm 24 is carried forwardly, a pin 145 mounted upon a rearward extension of said arm will contact with a cam face of clutch yoke 111 and will move said yoke to neutral position, wherein the motor will be disengaged from the calculating devices. The selector gears and other rotating parts of the machine having been arrested by contact of stop arm 24 with the fixed stop, will rebound therefrom this rebound being assisted by a suitable spring 28 (Fig. 14) on arm 24, and in this movement a tooth 220 of link 21 will engage the slide tooth 209 and throw clutch yoke 111 in a direction to provide for reverse operation of the machine. At the same time, element 25 striking the end of trigger 31 will be raised out of engagement with the lug of rock arm 22 and the machine will thus be free to continue in operation.

The setting of control lever 201 to active position also effects a clutch governing the automatic shifting of the numeral wheel carriage 2, which carriage at the time may stand in any ordinal position, as set, for instance, by manipulation of the knob on shaft 46. For this purpose, a member 217 connects the control lever with a clutch hub 61 of division shift cam 60, loosely mounted on the carriage shifting shaft 46. Rotation of shaft 46 will shift numeral wheel carriage 2 by the well-known means employed in the Monroe machine and illustrated in the applications hereinbefore referred to. Movement of the division lever to active position will move clutch hub 61 into engagement with a clutch member 62 fast upon shaft 46, so that counter-clockwise movement of this shaft, as viewed from the front of the machine, will shift carriage 2 to the left. The shifting impulse is transmitted as follows:

A link 46 connects arm 24 with one arm of a bell lever 52, so that as arm 24 swings forwardly in the direction of the fixed stop, bell lever 52 will be rocked and, through connection 57 will move a shifting lever 55 (Fig. 13), having a roller operating upon cam 60 to impart rotary movement to the clutch hub 61 and shift the carriage.

Alternate forward and reverse operation of the machine will be continued, with shifting of the numeral wheel carriage at the end of each operation, until control lever 201 is returned to inactive position, either manually or by means, hereinafter described, operating automatically when the numeral wheel carriage has advanced to extreme left hand position. When the control lever is so returned, means will be set whereby the machine will be allowed to complete the registration of the quotient figure which is then being calculated, and will then be brought to rest with all parts restored to normal position.

This means comprises a pin 219 carried by control lever 201, and so arranged that, when the control lever stands in inactive position, and clutch yoke 111 in additive clutch position, latch 213 will be held by said pin out of latching engagement with the pin 211 of sliding tooth 209. Thus, the machine will continue to operate until an additive rotation (which in division, includes a corrective operation designed to counteract a previous excessive subtraction) is completed, whereupon, if the control lever 201 stands in inactive position, latch 213 being tripped and tooth 209 retracted, the end of said tooth will be out of the path of movement of tooth 220 on link 21, and clutch yoke 111 will be left in neutral position.

In the movement of the control lever to inactive position, locking arm 200 will be released from latch 303 by the following means:

A plate 307 pivoted to latch lever 303 is raised at its rearward end by the upward movement of pin 145 on stop arm 24 as this arm is carried rearwardly in the final arresting operation. Plate 307 being raised by said pin, a cam face of the plate will be brought into contact with pin 310 on the retracted sliding tooth 209, this contact serving to push the plate forwardly and disengage latch lever 303 from locking arm 200, which will thereupon fall under the influence of its spring.

The means for returning control lever 201 to inactive position when carriage 2 is shifted to extreme left hand position, comprises a slide 311 having connection with control lever 201 and guiding engagement with stud 224. As the control lever is thrown to operative position, slide 311 will be advanced to a position with the free end thereof immediately overlying the path of movement of a crank pin 314 of the shaft 4. A lug 198 is provided on the carriage 2, said lug being adapted as the carriage is lifted and lowered into its extreme left hand position to depress the free end of the lever 223, contacting with and adapted to move slide 311 into the path of movement of pin 314, against the tension of a suitable spring. In the ensuing movement of the actuating mechanism, pin 314, contacting with slide 311, will push control lever 201 forwardly to inactive position.

As in other methods of division, the quotient is obtained by registering the net number of subtractions, which is done by means of the revolutions counter 85, but in the present method it is further necessary to have a tens carry mechanism between the counter wheels. It is further necessary, if the counter is to be capable of use also as a multiplier register (with the multiplier set up on keyboard 18), to have adjustable reversing gearing interposed in the drive train of the counter mechanism.

Heretofore such reversing gears have been manually adjustable to provide for a counter registration of like or unlike sign character to that of the principal register, but, according to the present invention, means are provided for automatically adjusting this gearing.

For this purpose, the latch 303, previously mentioned, is mounted fast upon a shaft 509, extending beneath keyboard 18 to the right-hand side of the machine (Figs. 2, 7 and 8). To the right-hand end of shaft 509 is secured an arm 510, having a rear pivotal extension 511 which, in the movement of latch 303, will adjust the reversing lever 399, controlling the reverse gear clutch 391 (Fig. 9).

Assuming lever 399 to be standing in its forward position, illustrated in Fig. 7, wherein clutch 391 is adjusted for similar registration on wheels 13 and 85, upon depression of division key 500 and setting of control lever 201, shaft 509 will be rocked, carrying extension 511 against a lug 512 of lever 399 and rocking said lever to its rearward position, illustrated in Fig. 8, wherein clutch 391 is adjusted for unlike registration on wheels 13 and 85.

In this movement, extension 511, guided by pin 513 in the frame of the machine, will fall sufficiently to bring a notch 514 of said extension into register with the lug 512 of lever 399, so that, upon the return of latch 303 to normal position, upon completion of the operation, the return movement of arm 510 will pull lever 399 forwardly, until pin 515 of said lever has passed the point of spring locator 516, whereupon said locator will complete the adjustment of lever 399 to its original position.

Assuming, however, that lever 399 stands in its rearward position when division key 500 is depressed, extension 511, in moving forward, not being supported by lug 512, will drop below said lug, so that upon the return of the parts to normal, lever 399 will again be left in its original adjusted position.

It will be noted that, in the machine illustrated, certain parts of the division mechanism, including latch 303 are returned to normal position while the numeral wheel actuators are beyond their full-cycle position, and that these actuators are returned to full-cycle position by a subsequent movement. In order, therefore, that the actuators of wheels 13 and those of wheels 85 may not become out of cycle with relation to each other, a dwell 517 is provided on the cam 518 which is located in the train of mechanism between lever 399 and clutch 391, so that the preliminary return movement of lever 399, imparted directly by extension 511, will not disturb the clutch. Spring locator 516, however, will hold the tooth 519 of clutch 391 against the face of the cooperating notched clutch member 520 until the actuators are returned to full-cycle position, and will then force the tooth into the notch, effecting the reversal.

Obviously, if it were not desired to leave lever 399 in its original adjusted position, at the conclusion of a division operation, the extension 511 could be formed without a notch 514, in which case it would operate as a pusher, to insure correct positioning of lever 399 in division.

Further, the present invention provides means whereby lever 399 will be correctly positioned both for negative operations (division) and positive operations and, assuming division to be performed always by the full automatic method above described, no manual adjustment of lever 399 is necessary. Therefore, it would come within the scope of the invention to confine lever 399 entirely within the casing of the machine and to rely solely upon the automatic adjustment thereof.

The machine is equipped with the usual non-repeat mechanism, which may be set to clear the keyboard at each cycle of operation, and means are provided herein for disabling the non-repeat devices during the operation of the automatic division means. (Figs. 7 and 10.)

As shown, the non-repeat devices comprise a slide 23 (Figs. 3, 4, 7 and 10), adapted to be moved, against the tension of a suitable spring, into engagement with the key-locking bails 6 of each row of keys of both keyboards. Two keys control the position of a lever 16, bringing the same into or out of the path of movement of a cam 17, secured upon a drive shaft of the machine, said lever, when operated by the cam, acting, through lever 15 to move slide 23 and release the keys.

In order to disable this mechanism, a plate 521 is interposed between slide 23 and lever 15, said plate having a pin and slot connection with the machine frame, about the pin, 522, of which it may pivot.

Plate 521 is designed to be engaged by the free end of arm 510, the operation of which, through latch 303, by control lever 201, has been previously described. Upon movement of lever 201 to active position, plate 521 will be carried rearwardly, a tooth 523 of said plate moving along the work arm of lever 15 to a point substantially opposite the fulcrum thereof, so that movement of lever 15 will not affect plate 521 nor slide 23.

It will be noted that this disabling means does not disturb the manually set condition of the non-repeat mechanism, so that, when the division operation is completed, the machine will operate in accordance with the previous setting of these parts.

If desired, the manual control keys for this non-repeat mechanism might be removed, since, as will be shown hereinafter, the automatic mechanism associated with control lever 201 may be utilized in multiplication as well as in division, so that the "four rules" operations may be performed and the non-repeat mechanism automatically disabled whenever it is essential that it should be.

In the present method of division, the numeral wheels, 13, associated with the higher order tens carry members in the stationary frame of the machine, will be rotated from 0 to 9 registering position, and the carriage 2 will then be shifted and the wheels 13 then associated with said carry members will be rotated from 9 to 0 registering position. In the machine illustrated, however, upon such shifting of the carriage, one of the wheels which has been brought to a registration of 9 will be moved out of register with the carry members, so that the succeeding operation, which leaves the true remainder registered on wheels 13, will fail to restore this particular wheel to a registration of 0.

In order to correct this condition, a plate 524 (Figs. 5 and 6), connected at one end by pin 312 to control lever 201, has a pin and slot connection with the machine frame designed, as lever 201 is thrown to active position, to guide a cam end 525 of the plate upwardly, into the position illustrated in Fig. 6. In this position of the plate, cam end 525 will be in the path of movement of the tens carry pin 9 of a wheel 13 which is being shifted to the left, out of register with the extreme left-hand tens carry member in the stationary frame of the machine. As will be noted from an inspection of Fig. 13, the forward portion of carriage 2, containing the wheels 13, will be raised in the shifting operation, so that the wheels will be carried in an arcuate path and lowered into shifted position. In this movement, the pin 9 above referred to, if its wheel 13 is then positioned to register 9, will be engaged by cam end 525, whereby the wheel will be rotated to 0 registering position.

Automatic multiplication

Any mechanism which controls the automatic registration of a quotient may be utilized to control the automatic registration of a product, by obtaining the quotient of the multiplier, divided by one, since the number of net rotations of the numeral wheel actuators in a given direction will be the same in registering the product as it is in registering the quotient.

Application No. 382,792, above referred to, shows means whereby upon depression of a single key one will be set in the keyboard, as a divisor, and the machine will be put in operation, under control of the division mechanism. However, since but one set of numeral wheel actuators were shown, rotating as a whole in one or the other direction, it was proposed to register the complement of the multiplier in the numeral wheels and to use the "built up" method of division, so that the quotient, and consequently the product, would be registered by additive rotations.

By applying the same principle of operation, however, to a machine equipped with two relatively reversible sets of differential actuators, as disclosed in Patent 1,793,155, the multiplier may be registered positively and one repeatedly subtracted therefrom by the operation of one set of actuators, while the multiplicand may be simultaneously added, by operation of the reversely rotating actuator set, to obtain the product.

The latter arrangement is shown in the present application, wherein the control lever 201 and its associated devices serves equally to regulate division and multiplication operations.

In addition to the operation control devices set by lever 201, there are two other settings to be made or assured in performing multiplication by this method. That is to say, one must be set in the keyboard 18, as in application No. 382,792, and the reversing lever 42, between the two actuator sets, must be adjusted to provide for unlike rotation of the respective actuators.

Therefore, a separate multiplication key, 526 (Figs. 3 and 5) is provided, operable upon a tooth 527 similar to but operable upon pin 502 independently of the tooth 501 associated with the division key, said multiplication key also having a cam foot 431 adapted, in the depression of the key, to displace a slide 433 and thereby rock the left-hand setting bail of keyboard 18, to set up one therein. Since key 526 is not adapted to be latched in depressed position, the setting of bail 19 (Fig. 3) is maintained throughout the division operation by means of a spring latch 435. This latch is allowed to drop to active position upon removal therefrom of a roller 440 (Fig. 2) mounted upon an extension of the lock arm 200, the latter being displaced at the beginning of an operation, as previously described. At the end of the operation arm 200, in falling, will bring roller 440 against latch 435, and the restoring spring operating upon bail 19 will return the parts to normal position.

Key 526 is also adapted to engage the forward end of a lever 528 (Figs. 3 and 5), the other end of which is provided with locator notches, cooperating with a pin in reverse gear lever 42, controlling the rotation of the actuators related to keyboard 35. Lever 42 is provided with a spring 529, normally resisted by locator lever 528 but operable, when the locator is lifted by the depression of key 526, to adjust the reverse gearing 41 (Figs. 5, 11 and 12) to position controlling unlike or opposite rotation of the two sets of actuators.

As in Patent 1,793,155, lever 42 is extended above the keyboard plate, and may be manually adjusted to any one of three positions, the mid position providing for disconnection of the left-hand actuator drive.

Examples of operation

For example, to divide 144 by 18, set the number 144 in the right-hand accumulator wheels, clear the counting wheels and set 18 in the keyboard, in line with the figures 14 on the accumulator wheels. Upon depression of the division key, 18 will be subtracted from 14, giving an accumulator wheel reading of 99964 and a counting wheel reading of 1. The carriage will now be automatically shifted, so that the amount 18 in the keyboard will be in line with the figures 64 in the accumulator wheels and so that the counting wheels will read 10. Upon further operation of the machine, 36 (twice 18) will be added to 99964 in the accumulator wheels, and 2 will be subtracted from 10 in the counting wheels, whereupon the machine will be stopped with the correct remainder (00000) and the correct quotient (8) appearing in the accumulator wheels and in the counting wheels respectively.

|  | Accumulator wheels | Counting wheels |
|---|---|---|
| Original registration | 00144<br>−18 | 00<br>+1 |
| After first operation | 99964<br>+36 | 10<br>−2 |
| After second operation | 00000 | 8 |

To multiply 23 by 12, with the carriage in extreme right-hand position, set the number 12 in the right-hand accumulator wheels, opposite the higher order keys of the right-hand keyboard, clear the counting wheels and set 23 in the left-hand keyboard. Upon depression of the multiplication key, 46 (twice 23) will be added upon the left-hand accumulator, 20 will be subtracted from the 12 registered on the left-hand accumulator and 2 will be added in the counting wheels. After shifting of the carriage, 184 (eight times 23) will be subtracted from the 460 appearing on the left-hand accumulator, leaving the product 276 registered therein, the right-hand accumulator being brought to zero by the subtraction of 8 from the registration 992 thereon, and the multiplier 12 will be registered on the counting wheels, by the subtraction of 8 from 20. Thus the product appears on the left-hand accumulator, the multiplier on the counting wheels and the multiplicand on the left-hand keyboard, the rest of the machine being clear.

|  | Left-hand wheels | Right-hand wheels | Counting wheels |
| --- | --- | --- | --- |
| Original registration | 000 +46 | 012 −2 | 00 +2 |
| After first operation | 460 −184 | 992 +8 | 20 −8 |
| After second operation | 276 | 000 | 12 |

I claim:

1. In a calculating machine having a product-dividend register operable to register positively or negatively, a multiplier-quotient register provided with reverse gear driving mechanism, a manually operable device for setting said reverse gear, and control means including a member operable to divide a dividend in said first-named register by a preset divisor and to register the quotient; a connecting member between said control means and said gear setting device, adapted for operation by said control member to adjust the gear for quotient registration unlike the sign of the dividend register operation, and means for restoring said connecting member, said connecting member including a selectively operable extension adapted to leave the gear setting device in its previous hand set position upon retraction of said control member.

2. In a calculating machine having numeral wheels, and a keyboard comprising keys adapted to be latched in set position; the combination with non-repeat mechanism comprising devices for automatically unlatching said keys and manually settable devices for rendering the automatic devices operable or inoperable, and means operable to divide an amount registered on said numeral wheels by an amount set in said keyboard, including a member adjustable to control and to effect the operation of connecting devices between the operating means and the non-repeat mechanism, settable by said adjustable member to disable the unlatching devices, and means for automatically restoring the connecting devices and thereby reenabling the unlatching devices upon retraction of said adjustable member.

3. In a calculating machine having numeral wheels, and a keyboard comprising keys adapted to be latched in set position; the combination with non-repeat mechanism comprising devices for automatically unlatching said keys and manually settable devices for rendering the automatic devices operable or inoperable, and means operable to divide an amount registered on said numeral wheels by an amount set in said keyboard, including a member adjustable to control and to effect the operation of connecting devices between the operating means and the non-repeat mechanism, settable by said adjustable member to disable the unlatching devices and means for automatically restoring the connecting devices, the connecting devices being adapted to leave the non-repeat mechanism in its previous hand set condition upon retraction of said adjustable member.

4. In a calculating machine having a transversely shiftable carriage, a dividend register thereon, differential operating means including tens transfer mechanism for said register mounted in a stationary frame, and automatic division means including mechanism operable upon transition of said register from positive to negative and from negative to positive registration to reverse the sign character of the registering operation and to shift the carriage; means including a member settable by said division means and operable automatically to restore a register wheel, shifted out of cooperative position with the carry mechanism, to zero registering position.

5. In a calculating machine having a transversely shiftable carriage, a dividend register thereon, differential operating means including tens transfer mechanism for said register mounted in a stationary frame, and automatic division means including a control member and mechanism settable thereby and operable upon transition of said register from positive to negative and from negative to positive registration to reverse the sign character of the registering operation and to shift the carriage; means including projections on the register wheels and a device settable by said control member and operable automatically to restore a register wheel, shifted out of cooperative position with the carry mechanism, to zero registering position.

6. In a calculating machine having a transversely shiftable carriage, a dividend register thereon, differential operating means including tens transfer mechanism for said register mounted in a stationary frame, and automatic division means including a control member and mechanism settable thereby and operable upon transition of said register from positive to negative and from negative to positive registration to reverse the sign character of the registering operation and to shift the carriage; means including projections on the register wheels and a cam settable by said control member into the path of shifting movement of said projections and operable automatically to restore a register wheel, shifted out of cooperative position with the carry mechanism, to zero registering position.

7. In a calculating machine having a plurality of registers; the combination with means for operating said registers in unison to effect alternative positive or negative registration, means for reversing the sign character of the registration upon one of said registers relatively to the sign character of the registration upon another register, and control means including a member operable to determine the sign character of the registration upon said last-named register and to effect the registration; of a member settable by the control member to control the adjustment of the reversing means and adapted to remain in such set position upon retraction of the control member, and means automatically operable after such retraction to restore the last-named member from set position.

8. In a calculating machine having a product-dividend register; the combination with means for operating said register to effect alternative positive or negative registration, a multiplier-quotient register provided with reverse gear driving mechanism, a manually operable device for setting said reverse gear, and control means including a member operable to divide a dividend in said first-named register by a preset divisor and to register the quotient, of a normally disengaged connecting member between said control means and said gear setting device, adapted for operation by said control member to adjust the gear for quotient registration unlike the sign of the dividend register operation, and means cooperating with said connecting member upon retraction of said control member to adjust the gear for multiplier registration like the sign of the product register operation and to disengage the connecting member.

STUART HILDER.

Certificate of Correction

Patent No. 2,160,361.  May 30, 1939.

STUART HILDER

It is hereby certified that errors appear in the printed specification of the above numbered patent requiring correction as follows: Page 4, second column, lines 62 to 70 inclusive, strike out the table and insert instead the following—

|  | Accumulator wheels | Counting wheels |
|---|---|---|
| Original registration | 00144<br>− 18 | 00<br>+1 |
| After first operation | 99964<br>+ 36 | 10<br>− 2 |
| After second operation | 00000 | 8 | page 5, first column, line 5, for the word "left-hand" read *right-hand*; lines 18 to 28 inclusive, strike out the table and insert instead the following—

|  | Left-hand wheels | Right-hand wheels | Counting wheels |
|---|---|---|---|
| Original registration | 000<br>+46 | 012<br>− 2 | 00<br>+2 |
| After first operation | 460<br>−184 | 992<br>+ 8 | 20<br>− 8 |
| After second operation | 276 | 000 | 12 | and that the said Letters Patent should be read with these corrections therein that the same may conform to the record of the case in the Patent Office.

Signed and sealed this 22nd day of August, A. D. 1939.

[SEAL]

Leslie Frazer

*Acting Commissioner of Patents.*